United States Patent
Dahi Taleghani et al.

(10) Patent No.: US 10,876,030 B2
(45) Date of Patent: Dec. 29, 2020

(54) CEMENT MATERIALS INCLUDING SHAPE MEMORY POLYMER AND METHODS OF MAKING CEMENT MATERIALS

(71) Applicants: Arash Dahi Taleghani, Boalsburg, PA (US); Guoqiang Li, Baton Rouge, LA (US)

(72) Inventors: Arash Dahi Taleghani, Boalsburg, PA (US); Guoqiang Li, Baton Rouge, LA (US)

(73) Assignee: BOARD OF SUPERVISORS OF LOUISIANA STATE UNIVERSITY AND AGRICULTURAL AND MECHANICAL COLLEGE, Baton Rouge, LA (US)

( * ) Notice: Subject to any disclaimer, the term of this patent is extended or adjusted under 35 U.S.C. 154(b) by 0 days.

(21) Appl. No.: 16/095,058

(22) PCT Filed: Apr. 20, 2017

(86) PCT No.: PCT/US2017/028521
§ 371 (c)(1),
(2) Date: Oct. 19, 2018

(87) PCT Pub. No.: WO2017/184813
PCT Pub. Date: Oct. 26, 2017

(65) Prior Publication Data
US 2019/0112517 A1    Apr. 18, 2019

Related U.S. Application Data

(60) Provisional application No. 62/325,532, filed on Apr. 21, 2016.

(51) Int. Cl.
C09K 8/467 (2006.01)
C04B 28/02 (2006.01)
(Continued)

(52) U.S. Cl.
CPC .......... C09K 8/467 (2013.01); C04B 24/2676 (2013.01); C04B 24/28 (2013.01);
(Continued)

(58) Field of Classification Search
None
See application file for complete search history.

(56) References Cited

U.S. PATENT DOCUMENTS

| 8,720,560 B2 | 5/2014 | Seth |
| 2012/0190593 A1* | 7/2012 | Soane ............... C09K 8/03 507/111 |

(Continued)

FOREIGN PATENT DOCUMENTS

| CN | 105505350 | 4/2016 |
| WO | 2009019464 | 2/2009 |

OTHER PUBLICATIONS

International Search Report and Written Opinion for PCT/US2017/028521 dated Jul. 19, 2017.
(Continued)

*Primary Examiner* — John J Figueroa
(74) *Attorney, Agent, or Firm* — Thomas | Horstemeyer, LLP (57) ABSTRACT

Embodiments of the present disclosure provide for modified cement material, methods of reducing or stopping cement shrinkage, methods of making modified cement material, and the like.

11 Claims, 8 Drawing Sheets

(51) Int. Cl.
*C04B 24/28* (2006.01)
*C04B 24/26* (2006.01)
*C04B 111/34* (2006.01)
*C04B 103/00* (2006.01)

(52) U.S. Cl.
CPC .......... *C04B 24/281* (2013.01); *C04B 24/282* (2013.01); *C04B 28/02* (2013.01); *C04B 2103/0045* (2013.01); *C04B 2111/34* (2013.01); *C04B 2111/346* (2013.01)

(56) References Cited

U.S. PATENT DOCUMENTS

| | | | |
|---|---|---|---|
| 2012/0306120 A1 | 12/2012 | Li | |
| 2013/0087333 A1* | 4/2013 | Seth | E21B 33/13 166/288 |
| 2014/0303287 A1 | 10/2014 | Li | |
| 2015/0167424 A1* | 6/2015 | Richards | E21B 33/134 166/386 |
| 2015/0361760 A1* | 12/2015 | McClung, III | C04B 40/0209 166/293 |
| 2017/0121591 A1 | 5/2017 | Lsu | |

OTHER PUBLICATIONS

High temperature shape memory polymers and ionomer modified asphalts, a 3/1-2, 9/7-8, 15/13-14, dissertation, The University of Akron. Aug. 2013. [Retrieved online Jun. 27, 2017].

* cited by examiner

Radial Cracks
Fig. 1A

Plastic Deformation
Fig. 1B

Circumferential Cracking
Fig. 1C

Incomplete Cementing
Fig. 1D

CEMENT MATERIALS INCLUDING SHAPE MEMORY POLYMER AND METHODS OF MAKING CEMENT MATERIALS

CROSS-REFERENCE TO RELATED APPLICATIONS

This application is the 35 U.S.C. § 371 national stage of PCT application having serial number PCT/US2017/028521, filed on Apr. 20, 2017. This application also claims priority to U.S. provisional application entitled "CEMENT MATERIALS INCLUDING SHAPE MEMORY POLYMER AND METHODS OF MAKING CEMENT MATERIALS," having Ser. No. 62/325,532 filed on Apr. 21, 2016, which are entirely incorporated herein by reference.

BACKGROUND

One of the serious challenges encountered in cementing oil and gas wells is the failure of the cement sheaths and its debonding from casing or formation rock. Shrinkage of the cement during setting and pressure fluctuations during fracturing and other operations are identified as one of the main drives behind these issues. Some expansive cement systems have been developed in the oil and gas industry to compensate for the shrinkage effect. All the expansive additives which have been developed so far have chemical reactions with the cement itself that would impact the mechanical strength and/or durability of the cement and have limited expandability.

SUMMARY

Embodiments of the present disclosure provide for modified cement material, methods of reducing or stopping cement shrinkage, methods of making modified cement material, and the like.

An embodiment of the present disclosure includes a modified cement material, among others, that includes: a cement slurry material including a shape memory polymer additive, wherein the shape memory polymer is in a programed state.

An embodiment of the present disclosure includes a modified cement material, among others, that includes: a cement slurry material including a shape memory polymer additive, wherein the shape memory polymer is in an activated state.

An embodiment of the present disclosure includes a modified cement material, among others, that includes: a cured cement material including a shape memory polymer additive, wherein the shape memory polymer is in an activated state.

An embodiment of the present disclosure includes a method of stopping or reducing shrinkage in cement, among others, that includes: disposing a shape memory polymer additive into cement slurry to form a modified cement slurry material, wherein the shape memory polymer is in a programed state; exposing the modified cement slurry material to an activation temperature, thereby causing the shape memory polymer additive to expand; and exposing the modified cement slurry material to a formation temperature to set into a modified cement material, wherein the activation temperature of the shape memory polymer is less than the formation temperature of the cement.

An embodiment of the present disclosure includes a method of stopping or reducing shrinkage in cement, among others, that includes: exposing a modified cement slurry material to an activation temperature, wherein the modified cement slurry includes a shape memory polymer additive in a programed state, wherein the exposure causes the shape memory polymer additive to expand; and exposing the modified cement slurry material to a formation temperature to set into a modified cement material, wherein the activation temperature of the shape memory polymer is less than the formation temperature of the cement.

An embodiment of the present disclosure includes a method of stopping or reducing shrinkage in cement, among others, that includes: disposing a shape memory polymer additive into cement slurry to form a modified cement slurry material, wherein the shape memory polymer is in a programmed state.

Other compositions, methods, features, and advantages will be or become apparent to one with skill in the art upon examination of the following drawings and detailed description. It is intended that all such additional compositions, methods, features and advantages be included within this description, be within the scope of the present disclosure, and be protected by the accompanying claims.

DISCUSSION

This disclosure is not limited to particular embodiments described, and as such may, of course, vary. The terminology used herein serves the purpose of describing particular embodiments only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Embodiments of the present disclosure will employ, unless otherwise indicated, techniques of chemistry, material science, and the like, which are within the skill of the art. Such techniques are explained fully in the literature.

The following examples are put forth so as to provide those of ordinary skill in the art with a complete disclosure and description of how to perform the methods and use the structures disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, formation type, manufacturing processes, dimensions, frequency ranges, applications, mud type, specific temperature window or the like, as such can vary. It is also to be understood that the terminology used herein is for purposes of describing particular embodiments only, and is not intended to be limiting. It is also possible in the present disclosure that steps can be executed in different sequence, where this is logically possible. It is also possible that the embodiments of the present disclosure can be applied to additional embodiments involving measurements beyond the examples described herein, which are not intended to be limiting. It is furthermore possible that the embodiments of the present disclosure can be combined or integrated with other measurement techniques beyond the examples described herein, which are not intended to be limiting.

It should be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Discussion

Embodiments of the present disclosure provide for modified cement material, methods of reducing or stopping cement shrinkage, methods of making modified cement material, and the like. In an embodiment, the modified cement material includes shape memory polymer cement expansion additives. In general, embodiments of the present disclosure can be used to reduce shrinkage of cement materials without little, if any, deteriorative effect on mechanical properties and/or setting time of the cement slurry. Embodiments of the present disclosure can be used in reducing the shrinkage of cement in wells such as gas or oil, preventing the shrinkage of cement in wells such as gas or oil, and preventing isolation failure or microannulus formation in cement. In addition, embodiments of the present disclosure can be used in squeeze cement jobs to remove existing microannulus fractures.

An embodiment of the present disclosure includes a modified cement material. Embodiments of the modified cement material can include: a cement slurry material including the shape memory polymer additive, where the shape memory polymer is in a programed state; a cement slurry material including the shape memory polymer additive, where the shape memory polymer is in an activated state; and a cured cement material including the shape memory polymer additive, where the shape memory polymer is in an activated state. In each of these embodiments, the shape memory polymer can be about 0.01 to 20 weight % or about 0.01-10 weight % of the cement slurry material or cured cement material.

As mentioned above, the shape memory polymer additive has a starting state, a programmed state, and an activated state. A more detailed description of the states and conversion of the states are provided herein and in the Example. In the starting state, the shape memory polymer additive has a starting diameter (or starting volume). In the programmed state, the shape memory polymer additive has a program state diameter (or program state volume). In the activated state, the shape memory polymer additive has an activated state diameter (or activated state volume). In an embodiment, the starting state has a diameter greater than the programmed state (and the corresponding volumes), while the programmed state has a diameter that is less than that of the activated state (and the corresponding volumes). In an embodiment, the starting diameter can be about 100 μm to 2 mm or about 100 μm to 5 mm. In an embodiment, the programmed state diameter can be about 100 μm to 1 mm and the activated state diameter can be about 100 μm to 5 mm or about 100 μm to 2 mm. In an embodiment, the shape memory polymer additive in the starting state is about 20 to 70% larger than the shape memory polymer additive in the programmed state. In an embodiment, the shape memory polymer additive in the activated state is about 20 to 50% larger than the shape memory polymer additive in the programmed state. In an embodiment, the amount of expansion of the shape memory polymer additive can be tailored for each specific application.

If the shape memory polymer additive is not spherical in shape, one or more of the programmed dimensions of the shape memory polymer particle (e.g., length, width) will increase in value upon conversion from the programmed state to the activated state. Use of the term "diameter" throughout the disclosure is done for convenience and clarity, and one or more of the dimensions for non-spherical shape memory polymer additive can correspond to the diameter dimension as used in the descriptions provided herein or volume for the corresponding states can be used.

The shape memory polymer additive in the programmed state will convert to the shape memory polymer additive in the activated state when an activation condition is applied to the shape memory polymer additive in the programmed state. In particular, when the cement slurry is subject to an activation temperature, the shape memory polymer additive will change states from the programmed state to the activated state. In an embodiment, the activation condition can be an activation temperature, a moisture, a light, a pH, a magnetic field, an ultrasonic wave, electricity current, and a combination thereof. In an embodiment, the activation condition can be an activation temperature. In an embodiment, the activation temperature can be tailored for each specific application. In an embodiment, the activation temperature can be about 10° C. to 180° C., about 10° C. to 120° C., or about 70° C. to 180° C., and is within or above the transition temperature of the polymer. The shape memory polymer additive in the programmed state can be exposed to the activation temperature in-situ in the cement material, and as a result the diameter of the shape memory polymer additive increases to that of the shape memory polymer additive in the activated state so that the shrinkage is reduced or stopped.

In an embodiment, the shape memory polymer additive can be composed entirely of a shape memory polymer material or can have a coating layer of shape memory polymer additive around a core (a core-shell material). In an embodiment, the shape memory polymer additive not including a core can have a diameter of about 20 μm to 2 mm or about 100 μm to 2 mm or about 100 μm to 5 mm when the shape memory polymer additive is in the starting state.

In an embodiment, the core can be a grain of sand, bauxite, ceramics, or other similar particle. In an embodiment, the core can have a diameter (or one or more of dimensions of a non-spherical core) of about 10 to 50 microns. In an embodiment, the layer of shape memory polymer additive can have a thickness of about 10 to 300 microns when the shape memory polymer additive is in the activated state. In an embodiment, the layer of shape memory polymer additive can have a thickness of about 5 to 200 microns when the shape memory polymer additive is in the programmed state. In an embodiment, the shape memory polymer additive is in the range of 25% to 99% by weight of the core-shell material.

A selection of the thermoplastic shape memory polymer can include if the thermoplastic shape memory polymer has a chemical reaction with the components of the cement that alters the cement. In an embodiment, the selected thermoplastic shape memory polymer does not chemically react with the components in the cement. In an embodiment, the selected thermoplastic shape memory polymer does not chemically react to an extent that the reaction alters the mechanical characteristics inherent to the cement without addition of the thermoplastic shape memory polymer (other than the intended elimination or reduction in shrinkage of the cement).

In an embodiment, the polymer can be a thermoplastic shape memory polymer. In an embodiment, the thermoplastic shape memory polymer can be selected for instance from organic thermoplastic polymer in the polymethacrylic acid family (e.g., poly(ethylene-co-methacyrlic acid), polyaryletherketone (PAEK) family (e.g., polyether ether ketone (PEEK)), polypropylene (PP), polystyrene, polyurethane, polynorbornene (e.g., polynorbornene units that are partially substituted by polyhedral oligosilsesquioxane (POSS)), polyester, polyether, polyethylene terephthalate (PET), polyethyleneoxide (PEO), poly(1,4-butadiene), poly(vinyl acetate), polyamide-6 (nylon-6), poly(tetrahydrofuran), poly (2-methyl-2-oxazoline), poly(ethylene adipate), MDI/1,4-butanediol, poly(ε-caprolactone), poly vinyl chloride, polyethylene/polyamide blend, and a combination thereof.

In an embodiment, the shape memory polymer additive can include poly(ethylene-co-methacrylic acid), ethylene-methacrylic acid copolymer, where the programing temperature is about 20° C.

A selection of the thermosetting shape memory polymer can include if the thermosetting shape memory polymer has a chemical reaction with the components of the cement that alters the cement. In an embodiment, the selected thermosetting shape memory polymer does not chemically react with the components in the cement. In an embodiment, the selected thermosetting shape memory polymer does not chemically react to an extent that the reaction alters the mechanical characteristics inherent to the cement without addition of the thermosetting shape memory polymer (other than the intended elimination or reduction in shrinkage of the cement).

In an embodiment, the shape memory polymer can be a thermosetting shape memory polymer. In an embodiment, the thermosetting shape memory polymer can be epoxy resin, cyanate resin, thermoset polyurethane, polyimide, polystyrene, or a combination thereof. In particular, the thermosetting shape memory polymer can be selected for instance from an organic thermosetting polymer in the epoxy family (e.g. bisphenol A diglycidyl ether, bisphenol F, epoxidised novolacs, aliphatic epoxy resins, glycyylamin epoxy resin, and the like) or a phenolic family (e.g. Novolacs (formaldehyde/phenol<1), Resoles (formaldehyde/phenol>1), polyhydroxyphenols, and the like). They can also be a blend, a composite, or an interpenetration network of thermoplastic and thermosetting shape memory polymers.

In an embodiment, the shape memory polymer additive can be included in a mixture including sand, bauxite, and/or ceramic and/or other types of proppants, where different types can have different dimensions, be made of different polymers, be made of a solid polymer material, be of a core/shell design (e.g., polymer material layer around a core), combinations thereof, and the like, and then added to the cement slurry. In this regard, the shape memory polymer additive can be used alone in the cement material or used in combination with any combination of the foregoing in the cement material.

In an embodiment, the shape memory polymer additive can be made by heating the shape memory polymer additive in the starting state to a programming temperature under a first pressure to form the shape memory polymer additive in the programmed state. Subsequently, the shape memory polymer additive in the programmed state is cooled under the first pressure to a cooling temperature (ambient temperature of about 0 to 40° C.), where the shape memory polymer additive remains in the programmed state after cooling. The programming temperature can be about the reservoir temperature. In other words, the programming temperature is greater than the transition temperature of the polymer, and since the molecular chains of the polymer are flexible, the polymer compresses under the first pressure. During the cooling process under the first pressure, the molecular chains of the polymer lock into place, so that when the first pressure is released, the shape memory polymer additive stays in the programmed state. Heating the shape memory polymer additive in the programmed state above the transition temperature of the polymer allows the locked molecular chains to release and convert to the activated state having a greater diameter, which in the context of the cement slurry, reduces or stops the shrinkage of the cured cement material.

As mentioned above, embodiments of the present disclosure can include a cement slurry including the shape memory polymers additives while in the programed stage. The shape memory polymer additive and the cement slurry material can be heated (e.g., or otherwise activate the shape memory polymers additive) to an activation temperature, which causes the shape memory polymers additive to expand to reduce or eliminate shrinkage. The cement slurry is subsequently heated to a formation temperature that sets the cement. In an embodiment, the activation temperature of the shape memory polymers additive can be less than the formation temperature of the cement. In an embodiment, the activation temperature is about 50 to 120° C., 10 to 120° C., or 10 to 180° C. Advantageously, the addition of the shape memory polymers additive does not delay the setting time. In an embodiment, the linear expansion of the cement slurry can be about 0.5 to 1%, which can be obtained by controlling the amount of shape memory polymer additive in cement slurry from about 5 to 10 weight % of the cement slurry.

In an embodiment, the shape memory polymers additive has no reaction with water or cement, thus does not affect the water to cement ratio of the cement slurry. Advantageously, due to this neutral chemical behavior, significant change in the viscosity or thickening time of the cement is not observed. The shape memory polymers additive can be in the form of granular materials, fibers, flakes and nanomaterials with potential combination with other cement additives as needed.

While embodiments of the present disclosure are described in connection with the Example and the corresponding text and figures, there is no intent to limit the disclosure to the embodiments in these descriptions. On the contrary, the intent is to cover all alternatives, modifications, and equivalents included within the spirit and scope of embodiments of the present disclosure.

Example

Cement is used to support the casing, control the corrosion of and also provide hydraulic isolation of various formations penetrated by the wellbore to prevent fluid flow from the high-pressure zone to low-pressure zones. In hydrocarbon wells, primary cementing is known as placing cement slurries into the annulus space between the drilled hole and the steel casing which soon hardens to support the casing and provides a strong, almost impermeable hydraulic seal to prevent any fluid migration in the annulus. The cement sheath is always exposed to various thermal and mechanical loadings, from the drilling phase to the plug and abandonment (P&A) phase. One of the most serious challenges encountered in cementing the casing in oil and gas wells is the failure of the cement sheath and its debonding from the formation rock. Cement integrity plays a critical role to practice safe geological carbon sequestration (Kutchko et al. 2007) as well as effective multistage fracturing (Wang and Dahi Taleghani, 2014) and refracturing treatments (King and Valencia, 2016) especially in vertical wells.

One of the main challenges in development of deep high pressure hydrocarbon wells is the control of fluid flow after cementing. Improper slurry design may lead to hydrocarbon flow and invade the cement slurry during and after the wait on cement (WOC) time. In these situations, the slurry is not able to convey required hydrostatic pressure. There are three possible paths for fluid migration in the cemented annulus: (1) Through the cement pore structure, (2) through the cement interface with rock and (3) cement-casing interface as the microannulus may create a potential path for flowing the hydrocarbons. When zonal isolation fails, production or injection efficiency is severely degraded. In some cases, the well is lost entirely or causes uncontrolled release of crude oil and/or natural gas from an oil well or gas well after pressure control systems have failure called underground blowout. No less significantly, such failure present environmental and safety implications since hydrocarbons or previously injected fluids may flow to the surface or into the nearby aquifers. Therefore sealing as a result of a cement job should last for many years. A study performed by the United States Mineral Management Service (MMS) in 2003 concluded that nearly 52% of all wells in the Outer Continental Shelf (OCS) of the Gulf of Mexico at the time showed sustained casing pressure, potentially resulting from channels in the cement behind pipe (Howard 2004). The fluid migration could be caused by incomplete cement displacement, extreme fluid loss and formation of microannulus. Microannulus may occur by shrinkage of cement volume or increase in tensile stress, which may induce very narrow cracks with less than 0.1 mm in width around the casing as the result. Even if cement slurry has completely filled the annulus and provides primarily a desired hydraulic seal, formation of a microannulus can cause zonal isolation failure over time (Goodwin et al. 1992, Jackson et al. 1993).

It's notable that a contained cement integrity problem may not cause as serious threats as extensive microannulus cracks (Wang and Dahi Taleghani, 2014b). Microannulus fractures may develop over time due to creep or numerous considerable pressure fluctuations during fracturing and refracturing operations.

The cement sheath failures have been recognized as the main cause responsible for upward fluid migration. Considering the extremely low permeability of cements, the fluid seeps around the casing mainly via cracks and microannulus channels in the cement. Potential factors for cement-casing and cement-rock bondings include poor mud removal, the condition of the formation surface before slurry placement, chemical interaction at the cement-to-formation interface, and the environmental condition (Parcevaux and Sault 1984, Jutten and Corrigall 1989, Ladva et al. 2005). Cement sheath failure, in general, can be classified into four major categories: a) radial cracking, b) plastic deformation in cement, c) circumferential cracking due to the loss of bonds between cement and casing interfaces (so called debonding) and d) incomplete cement sheath; all cases are illustrated in FIG. 1. The proposed additive will address all categories except failure due to plastic deformations.

Cement sheath failure may occur during production or pre-production stage. In the pre-production stage, formation damage during drilling, incomplete drilling mud removal, cement contamination by mud or formation fluid, filtration of the cement slurry, fracturing in formation due to cement, cement shrinkage and expansion can cause integrity problems (Bourgoyne et al. 1991, Lyons 1996, and Teodoriu et al. 2010). In production stage, reservoir compaction, subsidence, environmental geochemical attack, and chemical corrosion by carbon dioxide are the most expected reasons (Levine et al. 1979, Sabins et al. 1982, and Cheung and Beirute, 1985).

Several techniques such as Hydraulic or leak off test, temperature logging, and cement bond log (CBL) can be used to assess the integrity of cement behind the casing. Lack of a strong enough cement bonding requires a remedial cementing job to be performed to achieve the design requirements of the primary cement job. Many remedial jobs involve the technique of squeeze cementing or cement plugs. The purpose of the remedial cementing is repairing a primary cement job due to mud contamination, eliminate water intrusion, repair casing leaks caused by corrosion, seal the lost circulation zones, prevent fluid migration to production zone, and plug the non-productive zone or non-desired zones during injection (Marca, 1990). Cement squeeze and cement plugs are the common technique for remedial cementing. Prevention of cement shrinkage as one of the major causes of cement failure would eliminate or at least reduce the remedial cementing related costs. Additionally using this additive in squeeze jobs guarantee a more effective remedial treatment. This material can also be used in cement plugs used for plug and abandonment of oil and gas and geothermal wells. The expansive additives can be used in these operations to achieve a more reliable sealing by preventing any crack formation between cement plug and casing. In P&A applications, induction logging tool as well as other electromagnetic tools can be used to activate SMP particles by electromagnetic induces heat.

Despite recent advances of new diagnostics and the invention method and new varieties of cements and additives, fluid migration is still an issue in many places. In order to compensate for cement shrinkage and fill the gaps, one solution is utilizing expandable cement additives. Parker et. al (1966), Carter et. al (1966), and Sutama et al. (2013)

presented some field verifications that cement bonding partially improves upon using expansive cement systems. Ettringite system, aluminum powder, magnesium oxide and latex modified cements are some major expansive cement systems that have been developed for this purpose. Each one of these additives has its own application and limitations. Ettringite crystallization will be formed in hydrating process due to reaction of calcium aluminate with calcium sulfate. This system takes 8 to 16 hours to be activated, which could be too late to prevent gas migration (Chenevert et al., 1991). Aluminum powder and magnesium oxide can be used to provide expansion in cements (Carter et al., 1965). However aluminum powder reacts with the alkalis in the cement slurry and creates small bubbles of hydrogen which will be only effective in shallow depth applications since the expansive pressure as a result of bubbles cannot surpass pressure in deep formations. The reaction intensity depends on concentration and fineness of aluminum powder, temperature and pressure. Magnesium oxide (MgO) creates expansion in the cement matrix due to hydration to magnesium hydroxide which will occupy more space than the initial slurry. This system can be efficient in temperature as high as 550° F. (288° C.), but at temperatures lower than 140° F. (60° C.), the reaction hydration process is very slow (Spangle, 1977). Latex modified cements can reduce the cement shrinkage by bridging the cracks caused by shrinkage and improving tensile strength and cement to casing and cement to formation bonds (Ohama, 1987). This type of additive does not expand, however since the latex is mixed to cement slurry as a part of the liquid phase which is up to 30% by weight of cement (BWOC) and replaces a portion of mixed water, the film of the latex connects the hydrated cement particles and reduces the shrinkage. This amount of added latex will increase the cost of the projects and changes the rheological properties of the slurries. Different types of the latex have different sensitivity to temperature, but unfortunately cannot perform well at high temperatures (Woodward et al. 1962).

In the present disclosure, a new class of cement expansive additives that are made of shape memory polymers (SMP) is disclosed, which may address one or more of these problems. This class of polymer additives can be designed to expand when exposed to a specific temperature of about 50 to 120° C. The activation temperature should be slightly below the formation temperature at the cementing zone. It is notable that expansion occurs after placement of the cement and during its setting. Any expansion after cement setting may cause micro fractures and damage cement sheath's strength. Due to controlled expansion of the cement paste, the cement channeling and fluid migration will be diminished while retaining cement with required mechanical properties. The inert expandable additive, despite available commercial counterparts, does not change the mechanical properties of the cement sheath considerably and will be an effective solution to compensate for the potential shrinkage or induced gaps and bubbles. Additionally, the proposed material can be used in remedial cementing jobs.

Shape-Memory Polymers

Shape memory polymers are a member of the family of shape memory materials. It has been found that most SMPs can be deformed and fixed into a temporary shape and recover their original permanent shape by heating to above their transition temperature which is the glass transition temperature for amorphous SMPs and melting temperature for crystalline SMPs. Shape recovery can be triggered by light if the SMP molecules include photosensitive functional groups or by magnetic field if magnetic particles are dispersed in a heat-activating SMP matrix (Koerner et al. 2004; Lendlein et al. 2005; Mohr et al. 2006; Li and Xu, 2011a).

SMP will stay in temporary shape until it is exposed to the right stimulation, which results in deforming to original and "memorized" shape. When the polymer is heated to a specific threshold temperature which is called glass transition region ($T_g$), the mobility of the atoms increases and the movement of the segments along the loading direction will be possible (Li 2014). For SMP applications, they require to be programmed to form the temporary shape and then return to the original shape. The classical programming method has three thermo-mechanical cycle steps, involving changes in temperature, inducing stress and strain.

The first step starts at temperatures above $T_g$, applying a high strain deformation which is called pre-deformation, or pre-strain step. Second step is maintenance of the pre-deformation condition while reducing the temperature below $T_g$. The third step is the removal of the stress at the new low temperature. This completes programming. In the last step of the thermomechanical cycle, if we reheat the SMP to its initial temperature, but without any applied constraint, the pre-strain step will go back to zero, which means the SMP recovers its initial and permanent shape (Li and Xu, 2011b).

Figure 1A:
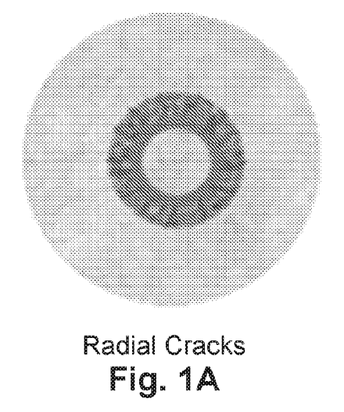
FIGS. 1A-D are schematics illustrating different modes of failure in the cement sheath.
Figure 1B:
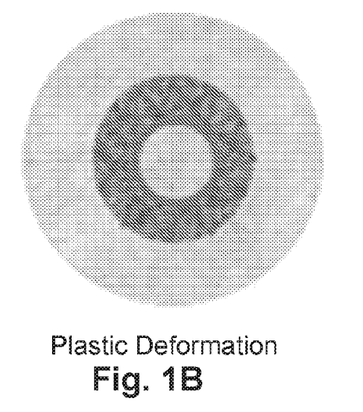
Figure 1C:
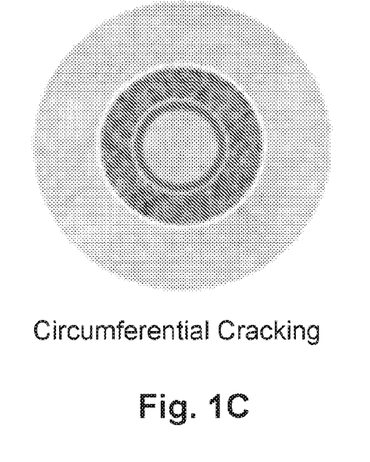
Figure 1D:
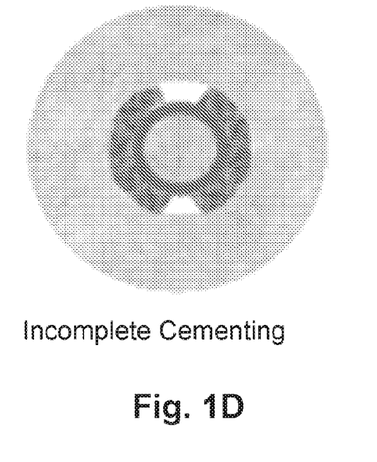
Figure 2A:
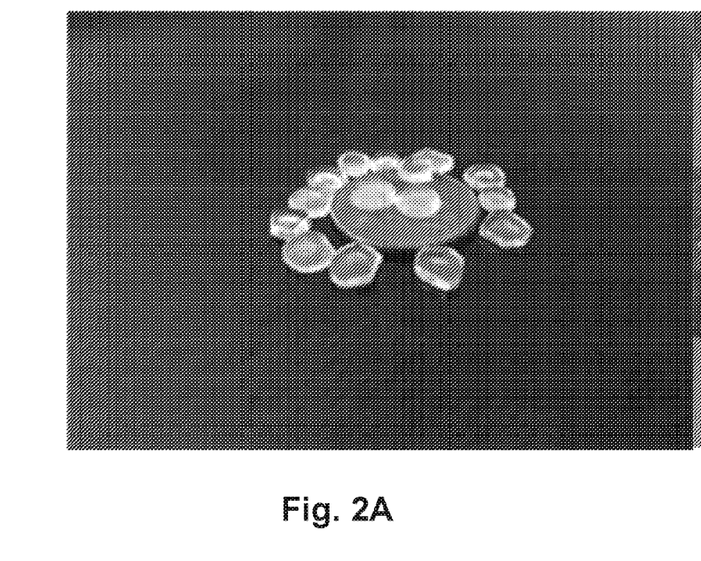
FIG. 2A is a photo of SMP expansive additive before activation (temporary state).
Figure 2B:
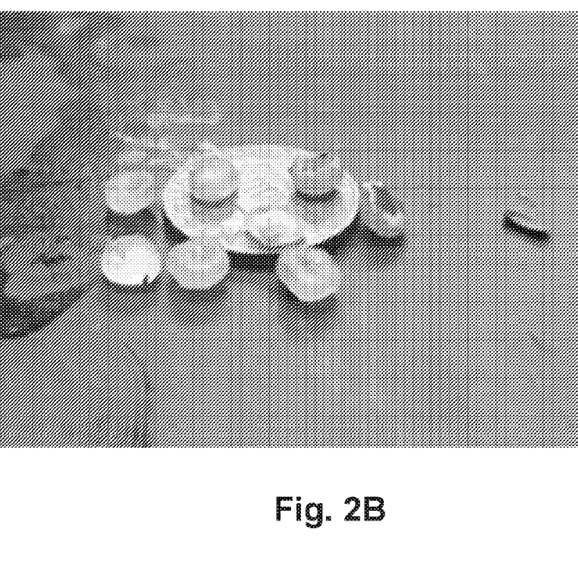
FIG. 2B is a photo of SMP expansive additive after activation (permanent state).

Another method to program the SMP is cold programming which happens in the glassy state or well below $T_g$. The shape memory process depends on condition of structural and stress relaxation instead of the high temperature programming which causes entropy change (Li and Wang, 2016). This involves the formation of a reversible plastic deformation, which means the deformation is stored mainly in the form of energetic force, and it can be reversibly recovered when heated up to the glass transition zone (Li and Wang, 2016). During cold programming, the molecules are frozen in a non-equilibrium state, and when unloaded, maintains a temporary shape (Li 2014). FIG. 2a shows a temporary shape of the SMP, while FIG. 2b shows the final permanent state of the SMP.

Figure 3:
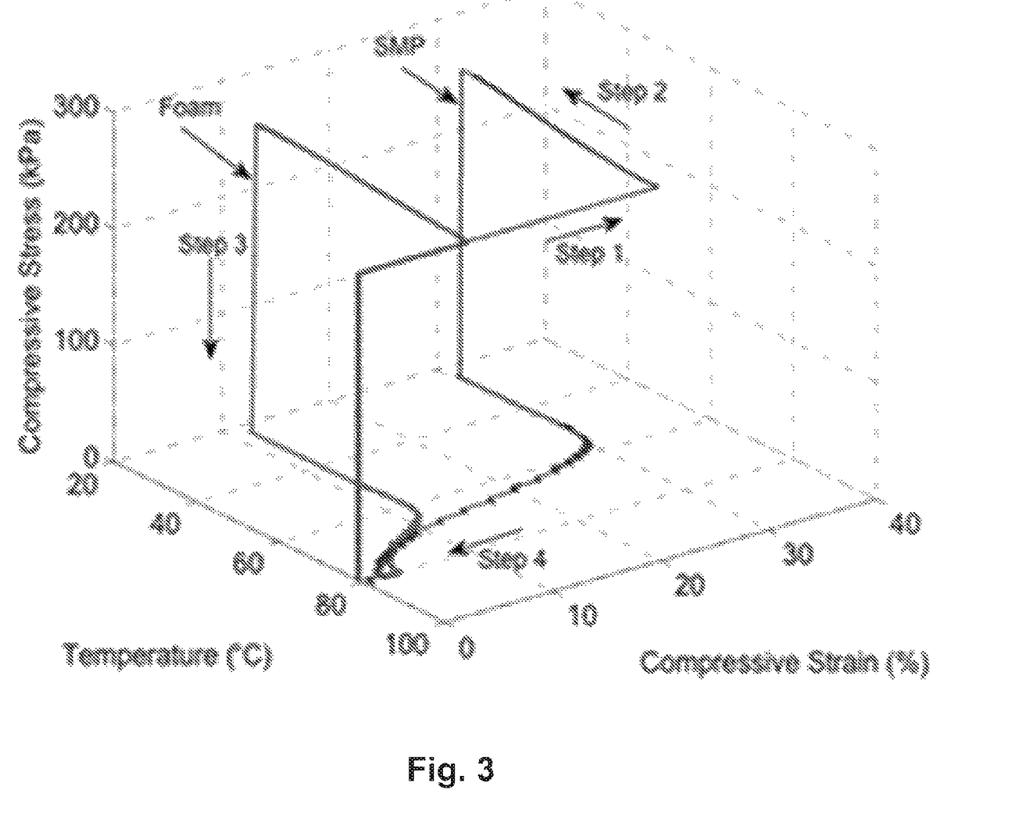
FIG. 3 illustrates the typical thermomechanical cycle for SMP and SMP foam (Li and Nettles 2010).

In the case of Shape Memory materials, the programming and shape recovery process are well described by the thermomechanical (TM) cycle, as shown in FIG. 3 for a pure amorphous SMP and SMP based syntactic foam. In general three steps are included in this cycle for hot programming: (1) High temperature loading: the temperature is elevated to above the transition temperature, i.e. $T_r$, where the mobility in the SMP molecular network is surged. The SMP molecular chains are flexible in this stage and they can cope with the applied external traction field. (2) Cooling: The SMP is cooled down to below $T_r$ while the external traction field is maintained. In this step the deformed molecular network retains the induced shape in step 1. (3) Low temperature unloading: The traction is then removed which result in elastically unloading the SMP and completing the programming process. This completes the hot programming process and the SMP can put in service. When triggered by heating, the SMP can recover, which is (4) Recovery: During the shape recovery stage the temperature is increased beyond the transition temperature where the locked molecular chains are able to restore their original configuration and in this step the SMP releases its memory. Programming could also be conducted at temperatures below the transition temperature such as cold compression programming for amorphous thermosetting SMPs. Theoretically, SMP recovers once the temperature enters the glass transition ($T_g$) region (usually, $T_g$ is the center of this region as determined by tan δ). If recovery occurs at the lower temperature side of the $T_g$ region, the recovery rate is low, but SMP additive will ultimately recover to the final shape at reasonable time scale before production drop in the wellbore.

In an embodiment, the ionomer Surlyn 8940 was used as the shape memory polymer. Surlyn 8940 is a semicrystalline poly(ethylene-co-methacrylic acid). The glass transition temperature is about 63.5° C. determined by DMA test. We also tested its shape memory effect. The programming temperature was also 63.5° C. The pre-strain was 55%. We found that the shape fixity ratio was 89.3% and the shape recovery ratio was 59.6%. Obviously, this ionomer SMP has weak shape memory effect.

It is noted that the Surlyn 8940 ionomer is in the form of particles. Therefore, we directly compression programmed the SMP in a hot compression molding device. The particles were compressed at 63.5° C. for 10 min. The load was then removed and the particles were allowed to cool down naturally. The fixed strain was 30%; see FIG. 2A.

Experiments

The SMP expandable additive is evaluated based on API 10B-5 standard to measure the percentage of the expansion of the cement sheath in the annulus. The second test is to measure compressive strength of the cement slurry with ultrasound cement analyzer (UCA) device presented and developed by Rao et al. (1982). The ultrasonic cement analyzer monitors the travel time of compressional wave energy through a cement sample as it cures under bottom-hole simulated high temperature and high pressure conditions. The sonic signal strength is correlated to the transit time using an empirical relationship initially established from mechanical compressive strength and transit time data for various slurry designs. However, the compressive strength values obtained using either the API crush test or the UCA are indicative of the integrity of the cement under uniaxial loading (no lateral restraint). In the wellbore, the cement is subject to complex triaxial loading, and the failure stresses may be substantially different from those observed in the standard compressive strength test (Neville, 1981). Furthermore, the compressive strength measurement provides no guide to the shear strength of the casing/cement or the casing/formation bond (Parcevaux and Sault, 1984). The time at which cement slurry begins building compressive strength is recorded and compared. All the tests are conducted with the repetition of two, to increase the accuracy and the amount of the additive will be varying from 0 to 5% of the weight of the cement in the slurry design and the results will be compared. Cement class H which is the most common cement used in the hydrocarbon well cement jobs has been used in this study.

Figure 4A:
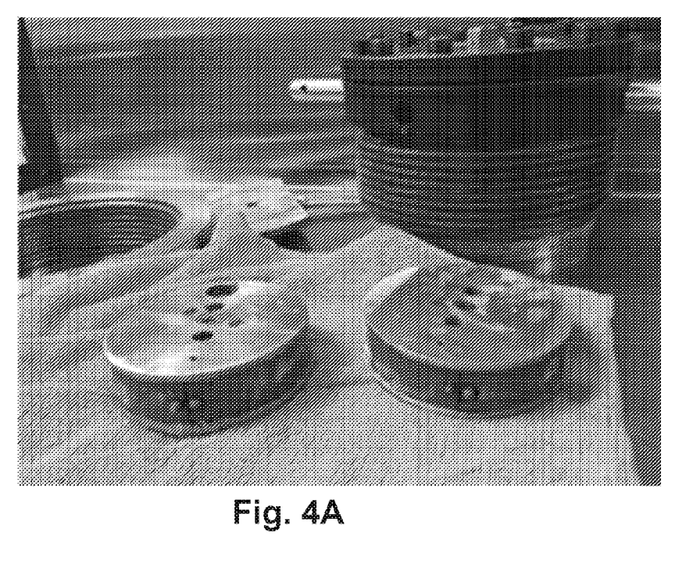
FIG. 4A is a photo of an annular ring expansion mold.
Figure 4B:
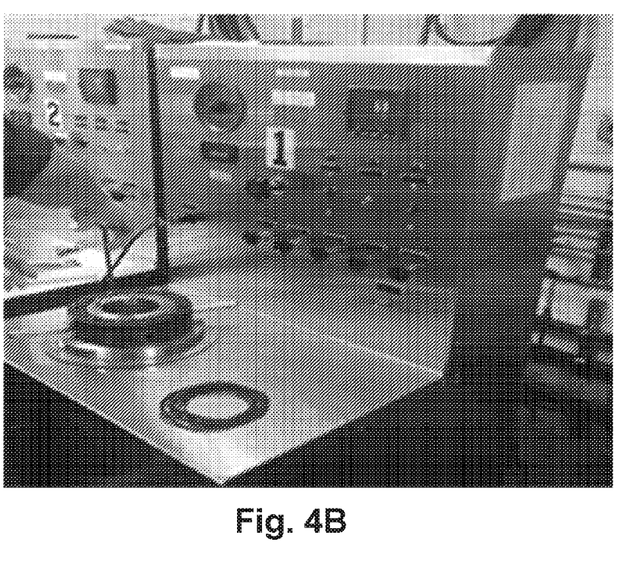
FIG. 4B is a photo of an expansion test, showing high pressure and temperature curing chamber.

For performing the annular ring expansion test, samples were prepared under API Spec 10A standard. The temperature and pressure test conditions for these sets of test has been set to 195° F. (90° C.) and 3000 psi. The 3000 psi was the highest pressure possible to be applied by the device. The expansion test has been conducted under API 10B-5 standard. The annular ring is the device for measuring the shrinkage/expansion recommended by API standard. This annular rings is fully confined from top and bottom, therefore the only means of shrinkage/expansion will be linear horizontal which mimics the annulus conditions to simulate the cement behavior in shrinkage compensation for micrannulus, washouts and channels. The mold dimensions are exactly as described in API 10B-5 specifications. The mold is then fully filled with the prepared sample and distance between the outside of the steel balls attached to the mold split is measured by micrometer with the precision of 0.02 mm (0.001 in). Next step is to cure the filled mold inside the consistometer with test temperature and pressure conditions for four days. The distance between the steel balls should be measured again each 24 hour. The circumferential change in percentage can be calculated as $\Delta l\ (\%) = (L_f - L_i) \times 0.35$, where $\Delta l\ (\%)$ is the circumferential change expressed in percentage. $L_f$ and $L_i$ are respectively the final and the initial distance between the steel pins expressed in millimeter. FIGS. 4A and 4B show the filled sample mold (FIG. 4A) and the curing device (FIG. 4B) used for the expansion test.

Figure 5:
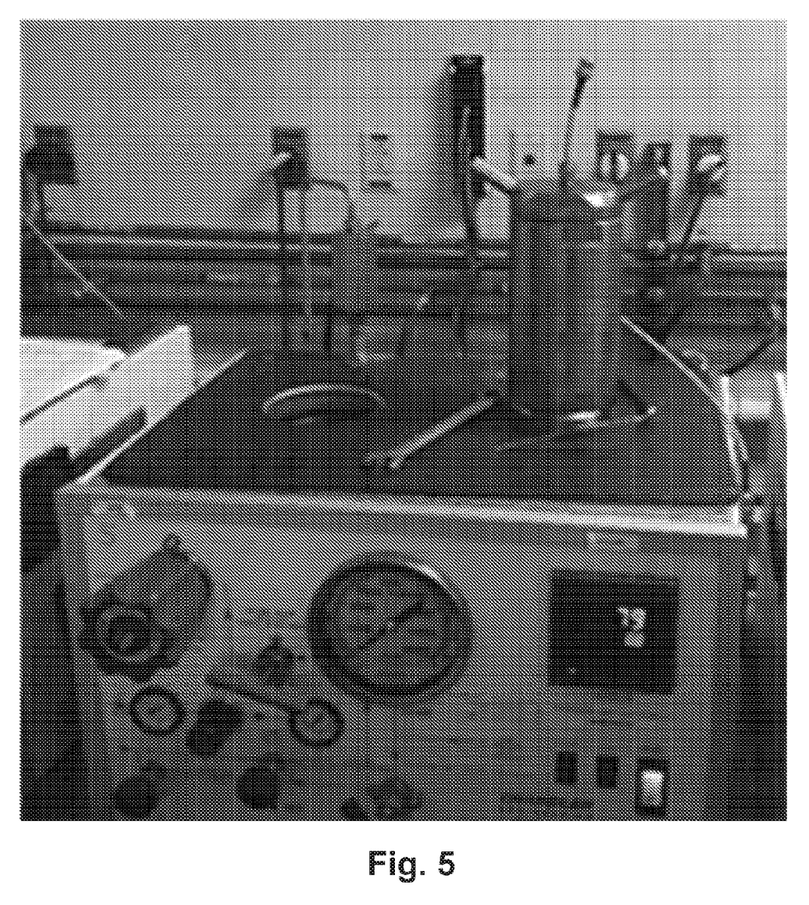
FIG. 5 is a photograph showing sample mold size and the UCA device used to measure the elastic modulus and strength.

Ultrasonic Cement Analyzer (UCA) device has been used to measure the rate of the compressive strength build up in the cement slurry to the time that cement reaches to the final stage of setting (see FIG. 5). The sample was prepared under API 10A specification. The slurry was filled in a cylinder of 4 inch in diameter and 4 inch of length. The cement slurry was confined from bottom and lateral side, then the transducer device was placed on top of the sample and was cured at 195° F. (90° C.) and 10,000 psi. FIG. 5 shows a UCA setup sample, including the cylindrical cement mold, p-wave transmitter and high pressure, high temperature curing chamber.

Results and Discussion

Figure 6:
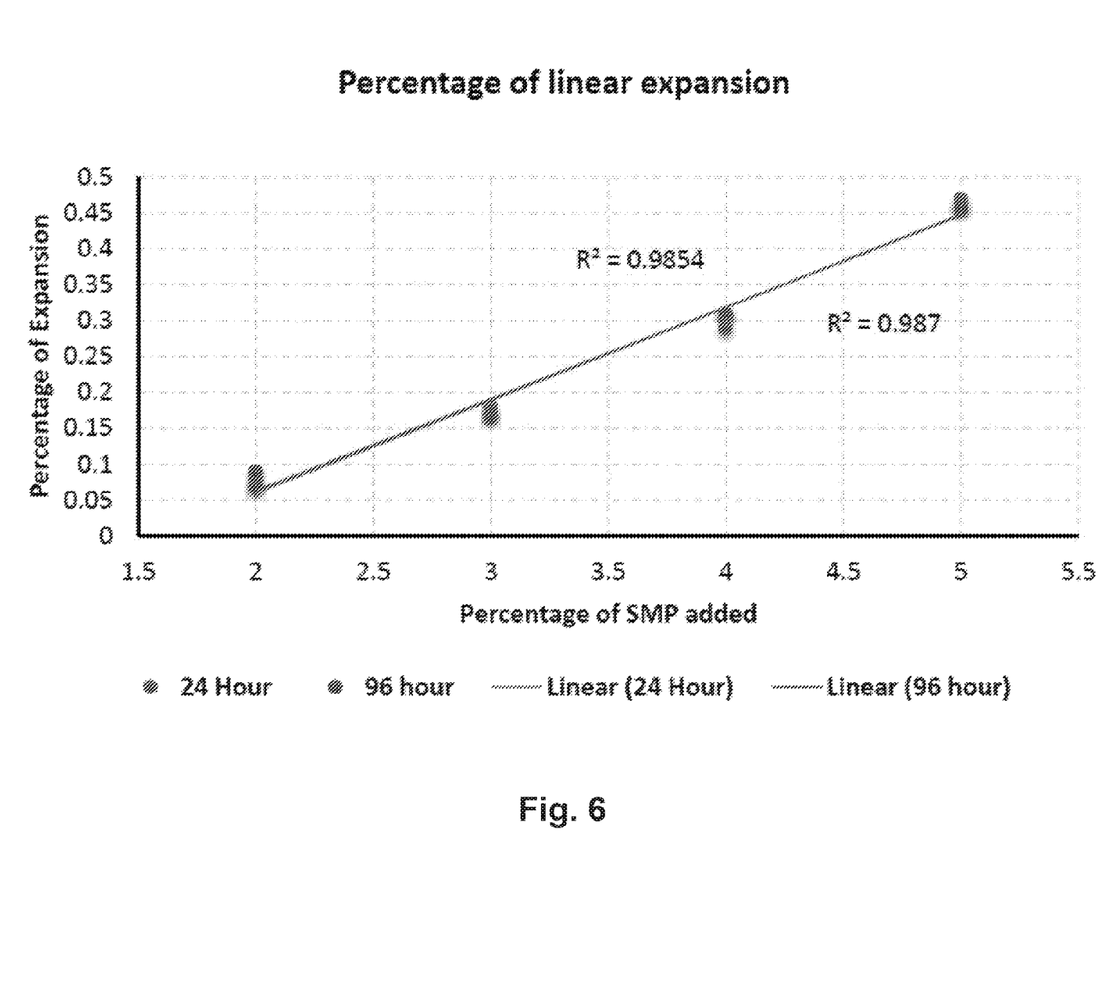
FIG. 6 is a graph illustrating the relationship between SMP added and the percentage of expansion.
Figure 7:
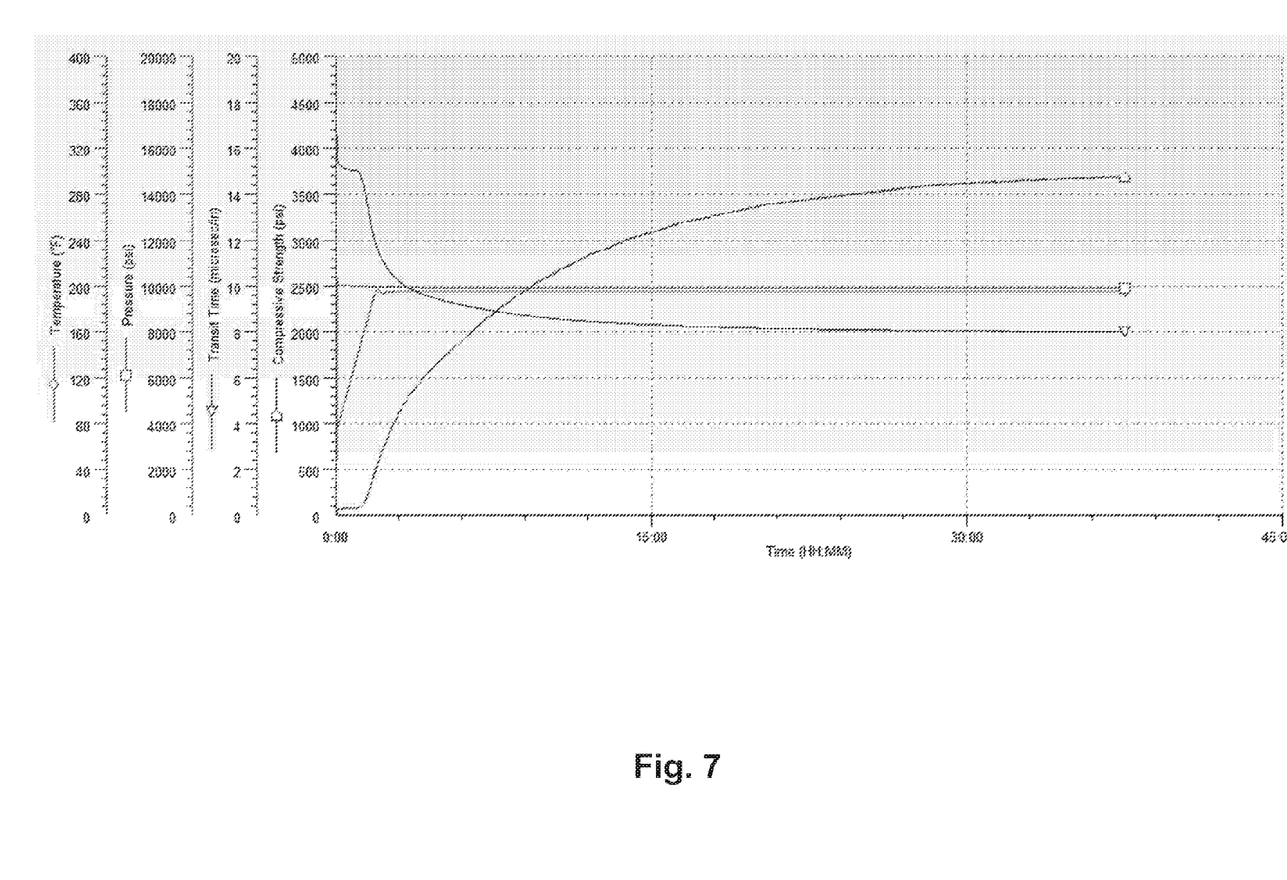
FIG. 7 is a graph illustrating compressional wave transit time and compressive strength in time for neat slurry.
Figure 8:
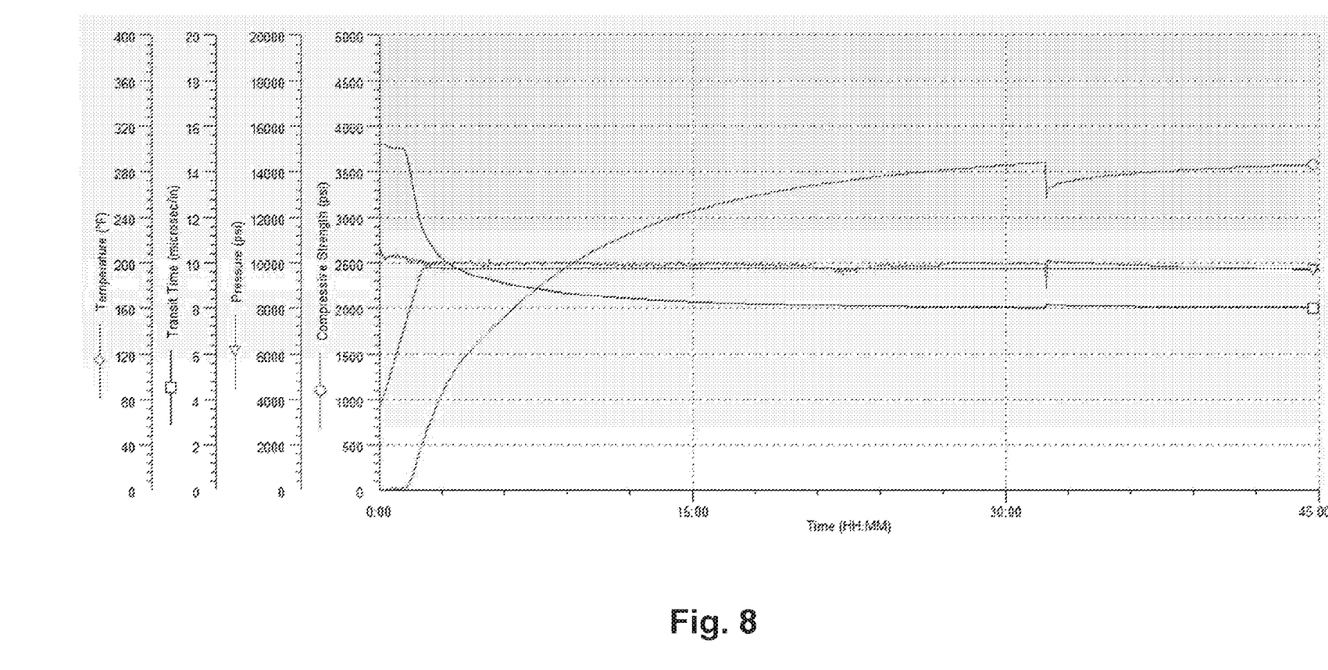
FIG. 8 is a graph illustrating compressional wave transit time and compressive strength in time for 3% additive.

The percentage change in circumferential of the annular ring measurements show that the obtained results from 24 hour and 96 hours measurement are the same. The second set of results shows the circumferential percentage change varies proportionally to the amount of the SMP additive to the cement slurry based on the weight of the cement. As we can see in the FIG. 6, the relationship is linear, which means by increasing the additive, the expansion percentage increased as a straight line. The most common desired linear expansion in the hydrocarbon cementing jobs is between 0.5 to 1%. The expansion experiment results state that for 5% SMP added, the linear expansion reaches to 0.47% and from the linear regression line, it is clear that 1% linear expansion can be obtained by 9% by weight of the class H cement SMP expansive additive. It is noted that the SMP used in this example has very limited shape memory capability. For SMPs with better shape memory effect, smaller fraction of SMPs can be used.

TABLE 1

Percentage of linear expansion measured for different BWOC of SMP after 24 and 96 hours.

| % of SMP added BWOC | Circumferential change percentage (24 hour) | Circumferential change percentage (96 hour) | Density (ppg) |
| --- | --- | --- | --- |
| 0 | 0 | 0 | 16.4 |
| 2 (1$^{st}$ test) | 0.07 | 0.07 | 16.3 |
| 2 (2$^{nd}$ test) | 0.08 | 0.09 | 16.3 |
| 3 (1$^{st}$ test) | 0.17 | 0.17 | 16.3 |
| 3 (2$^{nd}$ test) | 0.18 | 0.17 | 16.3 |
| 4 (1$^{st}$ test) | 0.31 | 0.31 | 16.2 |
| 4 (2$^{nd}$ test) | 0.29 | 0.31 | 16.2 |
| 5 (1$^{st}$ test) | 0.46 | 0.46 | 16.1 |
| 5 (2$^{nd}$ test) | 0.47 | 0.46 | 16.2 |

The results of the compressive test conducted by UCA device show that the added SMP particles did not have any deteriorative effect on the compressive strength and the time at which the slurry begins building up the matrix strength. This time is of significant importance as it allows resuming field operations after cementing. Table 2 shows the results for different added expansive SMP percentage by weight of the cement and the time at which the slurry strength reaches to 50 and 500 psi, which are the minimum thresholds in oilfield operations. It is notable that the added SMP particles did not delay the setting time of the cement slurry in the lab.

Since no change in the cement set time was observed for 2%, 3% and 4% additive compared to neat slurry without additive, the test was not conducted for higher percentage of the additives.

TABLE 2

Different percentage of SMP additive and time to reach 50 and 500 psi strength.

| Percentage of SMP additive | Time to reach to 50 psi strength (hh:mm) | Time to reach to 500 psi strength (hh:mm) |
|---|---|---|
| 0 | 1:18 | 1:54 |
| 2% | 1:23 | 2:00 |
| 3% | 1:22 | 2:02 |

In the case of field implementations, the expansion of the slurry results in increasing the compressive strength of the cement sheath because the slurry is fully confined in all directions in annulus. The minimum of 0.5 to 1% linear expansion is the required range of expansion to compensate for the shrinkage due to hydration and on the other hand does not build up excessive deteriorative internal stresses to cause microcracks or make the cement sheath too brittle.

Considering the fact that SMP additive has no reaction with water or cement, it does not affect the water to cement ratio of the cement slurry. Due to this neutral chemical behavior, significant change in the viscosity or thickening time is not observed. Density measurement of each slurry design, before filling the mold samples showed that as the percentage of the SMP additive increases in cement slurry, the slurry density decreases. However the amount of density reduction is not significant and can be easily compensated by either change in density design or adding high specific gravity additives.

Conclusion

In this Example, we presented the application of the shape memory polymer particles as an effective expansive cement additive. While the production price of the proposed additive is less than many additives available in the market, mechanical and rheological evaluation tests confirm the outcomes of utilizing this additive in the field applications as it does not have any deteriorative effect on mechanical strength or setting time of the cement paste in spite of current expansive additives. The proposed class of expandable additives can provide sustainable integrity in horizontal wells as well as vertical wells especially in naturally fractured formations. The amount of expansion for each SMP particle can be adjusted during the programming process. The trigging temperature at which the expansion happens can also be accustomed by minor adjustment of the chemical compositions or programming temperature. The proposed type of cement additives may open a new venue to address increasing concerns about wellbore integrity assurance before hydraulic fracturing and refracturing operations. The proposed additive can be extremely useful for squeeze jobs in remedial cementing jobs. Since the linear expansion percentage is changing proportionally to the amount of SMP added, any desired expansion can be easily obtained by changing the percentage of the added SMP by weight of cement. The most common linear expansion desired for primary cementing is between 0.5 to 1%, which can be obtained by changing the SMP additive amount from 5 to 9% BWOC.

REFERENCES

American Petroleum Institute Spec 10A, 2010, Specification for Cements and Materials for Well Cementing. Twenty-Fourth Edition, American Petroleum Institute RP10B-2, 1997, Recommended practice for testing well cements, 22nd edition.

American Petroleum Institute RP 10B-5, 2005, Recommended Practice on Determination of Shrinkage and Expansion of Well Cement Formulations. 1st Edition.

Bourgoyne, A. T, Millheim, K. K, Chenevert, M. E, Young, F. S, 1991, *Applied Drilling Engineering*, Vol. 2, Society of Petroleum Engineering, Richardson, Tex.

Chenevert, M. E., & Shrestha, B. K., 1991, Chemical Shrinkage Properties of Oilfield Cements (includes associated paper 23477). Society of Petroleum Engineers. doi:10.2118/16654-PA Carter, L. G., Waggoner, H. F., George, C. (1966, May 1). Expanding Cements for Primary Cementing. Society of Petroleum Engineers. doi:10.2118/1235-PA Cheung, P. R., and Beirute, R. M. (1985, Jun. 1). Gas Flow in Cements. Society of Petroleum Engineers. doi:10.2118/11207-PA.

Goodwin, K. J., & Crook, R. J. (1992, Dec. 1). Cement Sheath Stress Failure. Society of Petroleum Engineers. doi:10.2118/20453-PA Howard, D., 2004, Discussion of MMS notice to lessees and operators (NTL No. 2003-P072003), Houston, Tex., USA, August 2004.

Jackson, P. B., & Murphey, C. E. (1993, Jan. 1). Effect of Casing Pressure on Gas Flow Through a Sheath of Set Cement. Society of Petroleum Engineers. doi:10.2118/25698-MS.

Jutten, J. J., & Corrigall, E. (1989). Studies with narrow cement thickness lead to improved CBL in concentric casings. Journal of petroleum technology, 41(11), 1-158.

King, G. E. and Valencia, R. L., 2016, February. Well Integrity for Fracturing and Re-Fracturing: What Is Needed and Why? Present in SPE Hydraulic Fracturing Technology Conference, Society of Petroleum Engineers.

Koerner, H., Price, G., Pearce, N. A., Alexander, M., and Vaia, R. A. (2004). "Remotely actuated polymer nanocomposites—Stress-recovery of carbon-nanotube-filled thermoplastic elastomers." Nature Mater. 3(2), 115-120.

Kutchko, B. G., Strazisar, B. R., Dzombak, D. A., Lowry, G. V., and Thaulow, N., 2007, Degradation of well cement by $CO_2$ under geologic sequestration conditions. Environmental science and technology, 41(13), 4787-4792.

Ladva, H. K., Craster, B., Jones, T. G., Goldsmith, G., & Scott, D. (2005). The cement-to-formation interface in zonal isolation. SPE Drilling & Completion, 20(03), 186-197.

Lendlein, A., Jiang, H., Jünger, O., and Langer, R. (2005). "Light-induced shape-memory polymers." Nature, 434 (7035), 879-882.

Levine, D. C., Thomas, E. W., Bezner, H. P., & Tolle, G. C. (1979, Jan. 1). Annular Gas Flow After Cementing: A Look At Practical Solutions. Society of Petroleum Engineers. doi:10.2118/8255-MS Li, G., 2014, *Self-healing Composites: Shape Memory Polymer Based Structures*. First edition, John Wiley & Sons, Inc, West Sussex, UK.

Li, G., & Xu, T. (2011a). Thermomechanical characterization of shape memory polymer-based self-healing syntactic foam sealant for expansion joints. Journal of Transportation Engineering, 137(11), 805-814.

Li, G., and Xu, W. (2011b). Thermomechanical Behavior of Thermoset Shape Memory Polymer Programmed by Cold-Compression: Testing and Constitutive Modeling. Journal of the Mechanics and Physics of Solids, 59(6), 1231-1250.

Li. G., and Wang, A. (2016). Cold, Warm, and Hot Programming of Shape Memory Polymers. Journal of Polymer Science Part B: Polymer Physics, 54(14), 1319-1339.

Lyons, W. 1996 "Handbook of Petroleum and Natural Gas Engineering", Gulf Publishing Company.

Marca, C., 1990 'Remedial Cementing'. In: Nelson, E. B., (ed.), Well Cementing, Elsevier, New York.

Mohr, R., Kratz, K., and Weigel, T. (2006). "Initiation of shape-memory effect by inductive heating of magnetic nanoparticles in thermoplastic polymers." Proc. Natl. Acad. Sci. U.S.A., 103(10), 3540-3545.

Neville, A. M. 1981, Properties of Concrete. Pitman Publishing Ltd., London, 281-285.

Ohama, Y. 1987 "Principle of Latex Modification and Some Typical Properties of Latex-Modified Mortars and Concretes" ACI Materials J. (November-December 1987) 5 1 I-5 18

Parcevaux, P. A., Sault, P. H., 1984, Cement Shrinkage and Elasticity: A New Approach for a Good Zonal Isolation. Society of Petroleum Engineers. doi:10.2118/13176-MS Parker, P. N. (1966, May 1). Expanding Cement—A New Development in Well Cementing. Society of Petroleum Engineers. doi:10.2118/1315-PA Rao, P. P., Sutton, D. L., Childs, J. D., & Cunningham, W. C. (1982, Nov. 1). An Ultrasonic Device for Nondestructive Testing of Oilwell Cements at Elevated Temperatures and Pressures. Society of Petroleum Engineers. doi: 10.2118/9283-PA Sabins, F. L., Tinsley, J. M., & Sutton, D. L. (1982, Dec. 1). Transition Time of Cement Slurries Between the Fluid and Set States. Society of Petroleum Engineers. doi: 10.2118/9285-PA Spangle, L. B, 1988, Expandable Cement Composition, European Patent No. 254,342.

Sutama, C., & Inayah, F. (2013, Oct. 22). Expanding CementApplication for High Rate Gas Wells in South Sumatra. Society of Petroleum Engineers. doi:10.2118/165792-MS Teodoriu, C., Reinicke, K. M., Fichter, C., & Wehling, P. (2010, Jan. 1). Investigations on Casing-Cement interaction with application to Gas and CO2 Storage Wells. Society of Petroleum Engineers. doi:10.2118/131336-MS Wang, W., Dahi Taleghani, A., 2014, Simulating Multizone Fracturing in Vertical Wells. Journal of Energy Resources Technology, 136(4), 042902.

Wang W., A. Dahi Taleghani, 2014b, Three-Dimensional Analysis of Cement Sheath Integrity around Wellbores, Journal of Petroleum Science and Engineering vol. 121 p. 38-51.

Woodard, G. W. and Merkle, G. H. 1962, Composition of Hydraulic Cement and Polyvinyl Acetate and Use Thereof, U.S. Pat. No. 3,0158,520.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'".

While only a few embodiments of the present disclosure have been shown and described herein, it will become apparent to those skilled in the art that various modifications and changes can be made in the present disclosure without departing from the spirit and scope of the present disclosure. All such modification and changes coming within the scope of the appended claims are intended to be carried out thereby.

We claim at least the following:

1. A modified cement material, comprising:
   a cement slurry material including a shape memory polymer additive, wherein the shape memory polymer is in a programmed state; and
   wherein the shape memory polymer is an ionomer.

2. The material of claim 1, wherein the shape memory polymer is about 0.01-10 weight percent of the cement slurry material or cured cement material.

3. The material of claim 1, wherein the shape memory polymer is poly(ethylene-co-methacrylic acid).

4. A modified cement material, comprising:
   a cement slurry material including a shape memory polymer additive, wherein the shape memory polymer is in an activated state, and wherein the shape memory polymer is about 0.01-10 weight percent of the cement slurry material or modified cement material; and
   wherein the shape memory polymer is an ionomer.

5. The material of claim 4, wherein the shape memory polymer is a poly(ethylene-co-methacrylic acid).

6. A modified cement material, comprising:
   a cured cement material including a shape memory polymer additive, wherein the shape memory polymer is in an activated state; and
   wherein the shape memory polymer is an ionomer.

7. The material of claim 6, wherein the shape memory polymer is about 0.01-10 weight percent of the cured cement material.

8. The material of claim 6, wherein the shape memory polymer is a thermoplastic shape memory polymer selected from the group consisting of: poly(ethylene-co-methacrylic acid), ethylene-methacrylic acid copolymer, polyether ether ketone (PEEK), polypropylene (PP), polystyrene, polyurethane, polynorbornene, polyester, polyether, polyethylene terephthalate (PET), polyethyleneoxide (PEO), poly(1,4-butadiene), poly(vinyl acetate), polyamide-6 (nylon-6), poly (tetrahydrofuran), poly(2-methyl-2-oxazoline), poly(ethylene adipate), MDI/1,4-butanediol, poly(e-caprolactone), poly vinyl chloride, polyethylene/polyamide blend, and a combination thereof.

9. A method of stopping or reducing shrinkage in cement, comprising:
   disposing a shape memory polymer additive into cement slurry to form a modified cement slurry material, wherein the shape memory polymer is an ionomer in a programed state;
   exposing the modified cement slurry material to an activation temperature, thereby causing the shape memory polymer additive to expand; and
   exposing the modified cement slurry material to a formation temperature to set into a modified cement material, wherein the activation temperature of the shape memory polymer is less than the formation temperature of the cement.

10. The method of claim 9, wherein the activation temperature is about 10 to 120° C.

11. The method of claim 9, wherein the shape memory polymer is poly(ethylene-co-methacrylic acid).

\* \* \* \* \*